(12) United States Patent
Nguyen et al.

(10) Patent No.: US 7,577,847 B2
(45) Date of Patent: Aug. 18, 2009

(54) LOCATION AND USER IDENTIFICATION FOR ONLINE GAMING

(75) Inventors: Binh Nguyen, Reno, NV (US); Craig Paulsen, Reno, NV (US)

(73) Assignee: IGT, Reno, NV (US)

( * ) Notice: Subject to any disclaimer, the term of this patent is extended or adjusted under 35 U.S.C. 154(b) by 896 days.

(21) Appl. No.: 10/981,435

(22) Filed: Nov. 3, 2004

(65) Prior Publication Data
US 2006/0095790 A1    May 4, 2006

(51) Int. Cl.
*G06F 21/00* (2006.01)
(52) U.S. Cl. .................. 713/186; 713/182; 726/5; 726/11; 726/21; 380/231; 380/251; 463/29
(58) Field of Classification Search ................. 713/186, 713/182; 726/5, 11, 21; 380/231, 251; 463/29
See application file for complete search history.

(56) References Cited

U.S. PATENT DOCUMENTS

| | | | | |
|---|---|---|---|---|
| 5,079,717 A | * | 1/1992 | Miwa ........................ | 716/2 |
| 5,475,740 A | * | 12/1995 | Biggs et al. ............... | 379/91.02 |
| 5,833,540 A | * | 11/1998 | Miodunski et al. ........... | 463/42 |
| 5,851,149 A | * | 12/1998 | Xidos et al. ............... | 463/42 |
| 6,038,666 A | * | 3/2000 | Hsu et al. ................. | 713/186 |
| 6,091,957 A | * | 7/2000 | Larkins et al. ............ | 455/456.2 |
| 6,104,815 A | * | 8/2000 | Alcorn et al. .............. | 380/251 |
| 6,554,705 B1 | * | 4/2003 | Cumbers .................... | 463/29 |
| 6,562,553 B2 | * | 5/2003 | Mancini et al. ............. | 430/325 |
| 6,737,713 B2 | * | 5/2004 | Georgescu et al. .......... | 257/394 |
| 6,743,098 B2 | * | 6/2004 | Urie et al. .................. | 463/29 |
| 6,783,459 B2 | * | 8/2004 | Cumbers .................... | 463/29 |
| 6,884,166 B2 | * | 4/2005 | Leen et al. .................. | 463/16 |
| 6,887,151 B2 | * | 5/2005 | Leen et al. .................. | 463/16 |
| 6,934,858 B2 | * | 8/2005 | Woodhill .................... | 726/5 |

(Continued)

FOREIGN PATENT DOCUMENTS

WO    WO 03/042830 A1    5/2003

OTHER PUBLICATIONS

International Search Report, dated Mar. 16, 2006 from corresponding International Application No. PCT/US2005/037301, 6 pp. including Notification of Transmittal.

(Continued)

*Primary Examiner*—David García Cervetti
(74) *Attorney, Agent, or Firm*—Weaver Austin Villeneuve & Sampson LLP

(57) ABSTRACT

The present invention provides methods and devices for determining the location, identity and age of a user who desires to initiate a gaming session from an uncontrolled environment such as a home, a gaming kiosk or a hotel room. In some implementations, the user's location is determined in part by reference to a database of land telephone lines and corresponding addresses. The location may be verified by other methods, e.g., by determining the location of an Internet service provider's network device that is near a user's host device or via a cellular telephone network. The user may be asked to input a confirmation number and/or make an oral response during a telephone call to a telephone number associated with the uncontrolled environment. The user may also be prompted to make statements verifying his or her identity, age, a maximum amount available for wagering or other statements.

37 Claims, 5 Drawing Sheets

U.S. PATENT DOCUMENTS

| | | | | |
|---|---|---|---|---|
| 6,945,870 B2* | 9/2005 | Gatto et al. | | 463/29 |
| 7,035,626 B1* | 4/2006 | Luciano, Jr. | | 455/414.1 |
| 7,092,943 B2* | 8/2006 | Roese et al. | | 707/9 |
| 7,175,528 B1* | 2/2007 | Cumbers | | 463/29 |
| 7,212,828 B2* | 5/2007 | Hind et al. | | 455/456.1 |
| 7,218,739 B2* | 5/2007 | Multerer et al. | | 380/251 |
| 7,229,354 B2* | 6/2007 | McNutt et al. | | 463/29 |
| 7,239,669 B2* | 7/2007 | Cummings et al. | | 375/295 |
| 7,285,048 B2* | 10/2007 | Karmarkar | | 463/42 |
| 7,308,251 B2* | 12/2007 | Karaoguz | | 455/411 |
| 7,357,717 B1* | 4/2008 | Cumbers | | 463/29 |
| 7,360,248 B1* | 4/2008 | Kanevsky et al. | | 726/21 |
| 7,383,572 B2* | 6/2008 | Rolfe | | 726/5 |
| 7,420,464 B2* | 9/2008 | Fitzgerald et al. | | 340/539.13 |
| 7,437,147 B1* | 10/2008 | Luciano, Jr. | | 455/414.1 |
| 2001/0037211 A1* | 11/2001 | McNutt et al. | | 705/1 |
| 2002/0111213 A1* | 8/2002 | McEntee et al. | | 463/42 |
| 2002/0132663 A1* | 9/2002 | Cumbers | | 463/25 |
| 2002/0142846 A1* | 10/2002 | Paulsen | | 463/43 |
| 2002/0160834 A1* | 10/2002 | Urie et al. | | 463/29 |
| 2003/0006931 A1* | 1/2003 | Mages | | 342/357.06 |
| 2003/0017871 A1* | 1/2003 | Urie et al. | | 463/29 |
| 2003/0031321 A1* | 2/2003 | Mages | | 380/270 |
| 2003/0070100 A1 | 4/2003 | Winkler | | |
| 2003/0073499 A1* | 4/2003 | Reece | | 463/42 |
| 2003/0092489 A1* | 5/2003 | Veradej | | 463/36 |
| 2003/0139190 A1 | 7/2003 | Steelberg et al. | | |
| 2003/0195037 A1* | 10/2003 | Vuong et al. | | 463/29 |
| 2003/0217122 A1* | 11/2003 | Roese et al. | | 709/219 |
| 2003/0217151 A1* | 11/2003 | Roese et al. | | 709/225 |
| 2003/0225893 A1* | 12/2003 | Roese et al. | | 709/227 |
| 2003/0236120 A1* | 12/2003 | Reece et al. | | 463/42 |
| 2004/0053692 A1* | 3/2004 | Chatigny et al. | | 463/36 |
| 2004/0098588 A1* | 5/2004 | Ohba et al. | | 713/169 |
| 2004/0121841 A1* | 6/2004 | Xidos et al. | | 463/40 |
| 2004/0203908 A1* | 10/2004 | Hind et al. | | 455/456.1 |
| 2004/0224755 A1* | 11/2004 | Tallal, Jr. | | 463/25 |
| 2004/0259626 A1* | 12/2004 | Akram et al. | | 463/17 |
| 2005/0038825 A1* | 2/2005 | Tarabzouni et al. | | 707/200 |
| 2005/0054438 A1* | 3/2005 | Rothschild et al. | | 463/29 |
| 2005/0066044 A1* | 3/2005 | Chaskar et al. | | 709/230 |
| 2005/0091338 A1* | 4/2005 | de la Huerga | | 709/217 |
| 2005/0137006 A1* | 6/2005 | Rothschild et al. | | 463/20 |
| 2005/0187020 A1* | 8/2005 | Amaitis et al. | | 463/42 |
| 2005/0193209 A1* | 9/2005 | Saunders et al. | | 713/182 |
| 2006/0052162 A1* | 3/2006 | Soukup et al. | | 463/27 |
| 2007/0060319 A1* | 3/2007 | Block et al. | | 463/27 |
| 2007/0063037 A1* | 3/2007 | Silverbrook et al. | | 235/432 |
| 2007/0066347 A1* | 3/2007 | Silverbrook et al. | | 455/556.1 |
| 2007/0099698 A1* | 5/2007 | Cole | | 463/29 |
| 2007/0190494 A1* | 8/2007 | Rosenberg | | 434/11 |
| 2008/0254877 A1* | 10/2008 | Morrow | | 463/29 |
| 2008/0278772 A1* | 11/2008 | Silverbrook et al. | | 358/473 |
| 2009/0088206 A1* | 4/2009 | Silverbrook et al. | | 455/556.1 |
| 2009/0093897 A1* | 4/2009 | Lapstun et al. | | 700/94 |

OTHER PUBLICATIONS

Written Opinion of the International Searching Authority, dated Mar. 16, 2006 from corresponding International Application No. PCT/US2005/037301, 6 pp.

*Authentify*, Authentify/Register, www.authentify.com, printed Jun. 28, 2005, 2 pages.

Matt Richtel, *Launch of 'Net gambling puts MGM Mirage in the hot seat*, Appendix, New York Times News Service, Sep. 30, 2002, 2 pages.

* cited by examiner

LOCATION AND USER IDENTIFICATION FOR ONLINE GAMING

FIELD OF THE INVENTION

The present invention relates to online gaming. More particularly, the present invention relates to methods and devices for determining whether a user is authorized to participate in online gaming.

BACKGROUND OF THE INVENTION

Historically, certain types of gaming have been conducted with controlled environments such as casinos, card rooms, or similar gaming establishments. Offering games of chance in controlled environments allows the gaming establishment to verify a player's identity, age, etc.

However, in recent years, a number of gaming establishments have begun providing some games of chance to users who are located in uncontrolled environments, such as the user's home, a hotel room, etc. These gaming establishments will be referred to herein as "Internet casinos," although those of skill in the art will realize that Internet casinos are not casinos in a traditional sense and that Internet casinos may be accessed via networks other than the Internet. Typically, Internet casinos are groups of network devices (e.g., servers) that are configured to conduct games of chance, such as blackjack, video poker, etc., by interacting with a host device over a public network such as the Internet. This process will be referred to herein as "Internet gaming," whether or not the public network is the Internet and whether or not the gaming activity spans a state's border. The host device may be a gaming kiosk, a personal computer, a personal digital assistant, a cellular telephone, or another such host device.

Currently, federal law prohibits the offering of casino and sports wagers to residents of the United States across state lines via telephone or the Internet. The public policy grounds for these legal prohibitions include the difficulty in determining a player's identity and age, as well as determining whether the player is located in a jurisdiction within which such wagers would be permitted if made in person. However, it is anticipated that Internet gaming will eventually be offered within certain jurisdictions (e.g., within the state of Nevada) and possibly between jurisdictions that allow gaming. Therefore, it would be desirable to provide improved systems for determining the identity, age and location of a player who desires to participate in Internet gaming.

SUMMARY OF THE INVENTION

The present invention provides methods and devices for determining the location, identity and age of a user who desires to initiate a gaming session from an uncontrolled environment such as a gaming kiosk, a home or a hotel room. In some implementations, the user's location is determined in part by reference to a database of land telephone lines and corresponding addresses. The location may be verified by reference to a location determined by other methods, e.g., by determining the location of an Internet service provider's network device that is near a user's host device. In other implementations, the user's location is determined by information provided by a cellular telephone network. The user may be asked to input a confirmation number and/or make an oral response during a telephone call to a telephone number associated with the uncontrolled environment. These oral response may be analyzed to verify the user's identity. The user may also be prompted to make statements verifying his or her identity, age, a maximum amount available for wagering or other statements, which are preferably recorded and stored.

Some implementations of the invention provide a gaming authentication method. The method includes the steps of receiving a request to initiate a gaming session from a user, the gaming session comprising the following steps: receiving a wager on a game; determining an outcome for the game; and presenting the outcome of the game. The method also includes these steps: ascertaining whether the user is in a location for which the gaming session would be permitted; determining a telephone number associated with the location; placing a telephone call to the telephone number; prompting the user for a biometric response; and verifying whether the user is an authorized user based in part on the biometric response. The biometric response may be, for example, a voice response, fingerprint data, retinal scan data, facial recognition data and/or hand shape data. The method may involve initiating the gaming session when the user is an authorized user.

The method may also include the steps of prompting the user to enter a confirmation number and verifying that the user has entered the confirmation number. The verifying step may involve storing (e.g., making a first recording of) the biometric response. The verifying step may also involve analyzing the biometric response to determine first characteristics and comparing the first characteristics with second characteristics of the user. The verifying step may include verifying that the user is old enough to participate in the gaming session according to laws applicable to the location. The verifying step may involve verifying that a bet size, a session time, a maximum prize allowed, a time of day for gaming or a purse size is permissible according to laws applicable to the location.

The ascertaining step may involve determining positioning data associated with a cellular telephone and/or determining an address associated with the telephone number. The ascertaining step may include determining a user location and comparing the user location with a list of locations for which gaming may be conducted from an uncontrolled gaming environment.

The prompting step may involve prompting the user to state an amount of money that the user will authorize for the gaming session, prompting the user to state the user's identity, prompting the user to state a maximum amount of time that the user will be authorized to spend for the gaming session, prompting the user to make sounds and/or to say words that were (or were not) recorded during a user registration process and/or prompting the user to say words in a first sequence that were recorded in a second sequence during a user registration process.

The step of determining a user location can include the steps of determining a location of a network device in the vicinity of a host device operated by the user and comparing the location of the network device with the address associated with the telephone number. The method can also include the step of determining whether an account associated with the user contains an amount of money authorized by the user.

Alternative implementations of the invention provide a computer program embodied in a machine-readable medium. The computer program includes instructions for controlling at least one network device to receive a request to initiate a gaming session from a user, the gaming session comprising: receiving a wager on a game; determining an outcome for the game; and presenting the outcome of the game. The computer program also includes instructions for controlling at least one network device to perform the following steps: ascertain whether the user is in a location for which the gaming session would be permitted; determine a telephone number associated with the location; place a telephone call to the telephone number; prompt the user for a biometric response; and verify whether the user is an authorized user based in part on the biometric response. The biometric response may be a voice response, fingerprint data, retinal scan data, facial recognition data and/or hand shape data.

The computer program may also include instructions for controlling at least one network device to perform the following steps: prompt the user to enter a confirmation number; verify that the user has entered the confirmation number and initiate the gaming session when the user is an authorized user.

The verifying step may involve storing (e.g., making a first recording of) the biometric response, analyzing the biometric response to determine first characteristics and/or comparing the first characteristics with second characteristics of the user.

Other embodiments of the invention provide an integrated circuit operable to control a network device to receive a request to initiate a gaming session from a user, the gaming session comprising: receiving a wager on a game; determining an outcome for the game; and presenting the outcome of the game. The integrated circuit is also operable to control the network device to perform the following steps: ascertain whether the user is in a location for which the gaming session would be permitted; determine a telephone number associated with the location; place a telephone call to the telephone number; prompt the user for a biometric response; and verify whether the user is an authorized user based in part on the biometric response.

The biometric response may be a voice response, fingerprint data, retinal scan data, facial recognition data and/or hand shape data. The integrated circuit may be an application-specific integrated circuit. Related embodiments of the invention provide a set of semiconductor processing masks representative of at least a portion of the integrated circuit.

Yet other embodiments of the invention provide a network device having at least one port configured for communication with a network and at least one logic device configured to receive a request to initiate a gaming session from a user, the gaming session including: receiving a wager on a game; determining an outcome for the game; and presenting the outcome of the game. At least one logic device of the network device is also configured to perform the following steps: ascertain whether the user is in a location for which the gaming session would be permitted; determine a telephone number associated with the location; place a telephone call to the telephone number; prompt the user for a biometric response; verify whether the user is an authorized user based in part on the biometric response; and initiate the gaming session when the user is an authorized user. The biometric response may be a voice response, fingerprint data, retinal scan data, facial recognition data and/or hand shape data.

At least one logic device of the network device may be further configured to prompt the user to enter a confirmation number and verify that the user has entered the confirmation number. The verifying step may involve storing (e.g., making a first recording of) the biometric response. The verifying step may involve: analyzing the biometric response to determine first characteristics; and comparing the first characteristics with second characteristics of the user.

Still other embodiments of the invention provide a network device that includes at least one port configured for communication with a network and at least one logic device configured to perform the following steps: receive a request from a gaming server to authenticate a user who has made a request to initiate a gaming session from an uncontrolled gaming environment; ascertain whether the user is in a location for which the gaming session would be permitted; determine a telephone number associated with the location; place a telephone call to the telephone number; prompt the user for a biometric response; verify whether the user is an authorized user based in part on the biometric response; and send a message to the gaming server indicating whether the user is an authorized user and whether the user is in a location for which the gaming session would be permitted.

The gaming session involves: receiving a wager on a game; determining an outcome for the game; and presenting the outcome of the game. At least one logic device is further configured to prompt the user to enter a confirmation number and verify that the user has entered the confirmation number.

The verifying step may involve making a first recording of the biometric response, analyzing the biometric response to determine first characteristics and comparing the first characteristics with second characteristics of the user. The biometric response may be a voice response, fingerprint data, retinal scan data, facial recognition data and/or hand shape data.

Other embodiments of the invention provide a network device, including: at least one port configured for communication with a network; and at least one logic device configured to perform the following steps: receive a request to initiate a gaming session, the request being from a user in an uncontrolled gaming environment; send an authentication request regarding the user to a verification server, the authentication request including a telephone number associated with the uncontrolled gaming environment; receive an authentication response from the verification server; and initiate the gaming session when the authentication response indicates that the user is an authorized user and that the uncontrolled gaming environment is an authorized location. The gaming session involves receiving a wager on a game, determining an outcome for the game and presenting the outcome of the game.

These and other features of the present invention will be presented in more detail in the following detailed description of the invention and the associated figures.

BRIEF DESCRIPTION OF THE DRAWINGS

The invention may best be understood by reference to the following description taken in conjunction with the accompanying drawings, which are illustrative of specific embodiments of the present invention.

DESCRIPTION OF THE PREFERRED EMBODIMENTS

Reference will now be made in detail to some specific embodiments of the invention including the best modes contemplated by the inventors for carrying out the invention.

Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. Moreover, numerous specific details are set forth below in order to provide a thorough understanding of the present invention. The present invention may be practiced without some or all of these specific details. In other instances, well known process operations have not been described in detail in order not to obscure the present invention.

The present invention provides methods and devices for determining the location, identity and age of a user (also referred to herein as a "player" or a "client") who desires to initiate a gaming session from an uncontrolled environment. The uncontrolled environment may be stationary, such as a gaming kiosk, a home or a hotel room. In such stationary environments, the user may wish to initiate a gaming session from a desktop computer, a laptop, or a similar device. In some implementations, if the user's location is fixed, the location will be determined in part by reference to a database of land telephone lines and corresponding addresses. The location may be verified by reference to a location determined by other methods, e.g., by use of a "traceroute" or similar program to determine the location of an Internet service provider's network device that is near a user's host device.

The user may be asked to input a confirmation number and/or make an oral response during a telephone call to a telephone number associated with the uncontrolled environment. The oral response may be analyzed, e.g., according to known voice biometrics of a user obtained during a registration process, to verify the user's identity. The user may also be prompted to make statements verifying his or her identity, age, a maximum amount available for wagering or other statements, which are preferably recorded and stored.

However, a user's location may sometimes change during the course of a gaming session. Therefore, in some implementations, a user's location is determined in other ways, e.g., by reference to positioning information provided by a cellular telephone network. For example, if the user is called on a cellular telephone to verify his or her identity, it may be presumed that the user's location could change during the gaming session. The location is preferably checked again during the gaming session (if one is established) in order to ensure that the player is still within a jurisdiction that allows online gaming.

Figure 1:
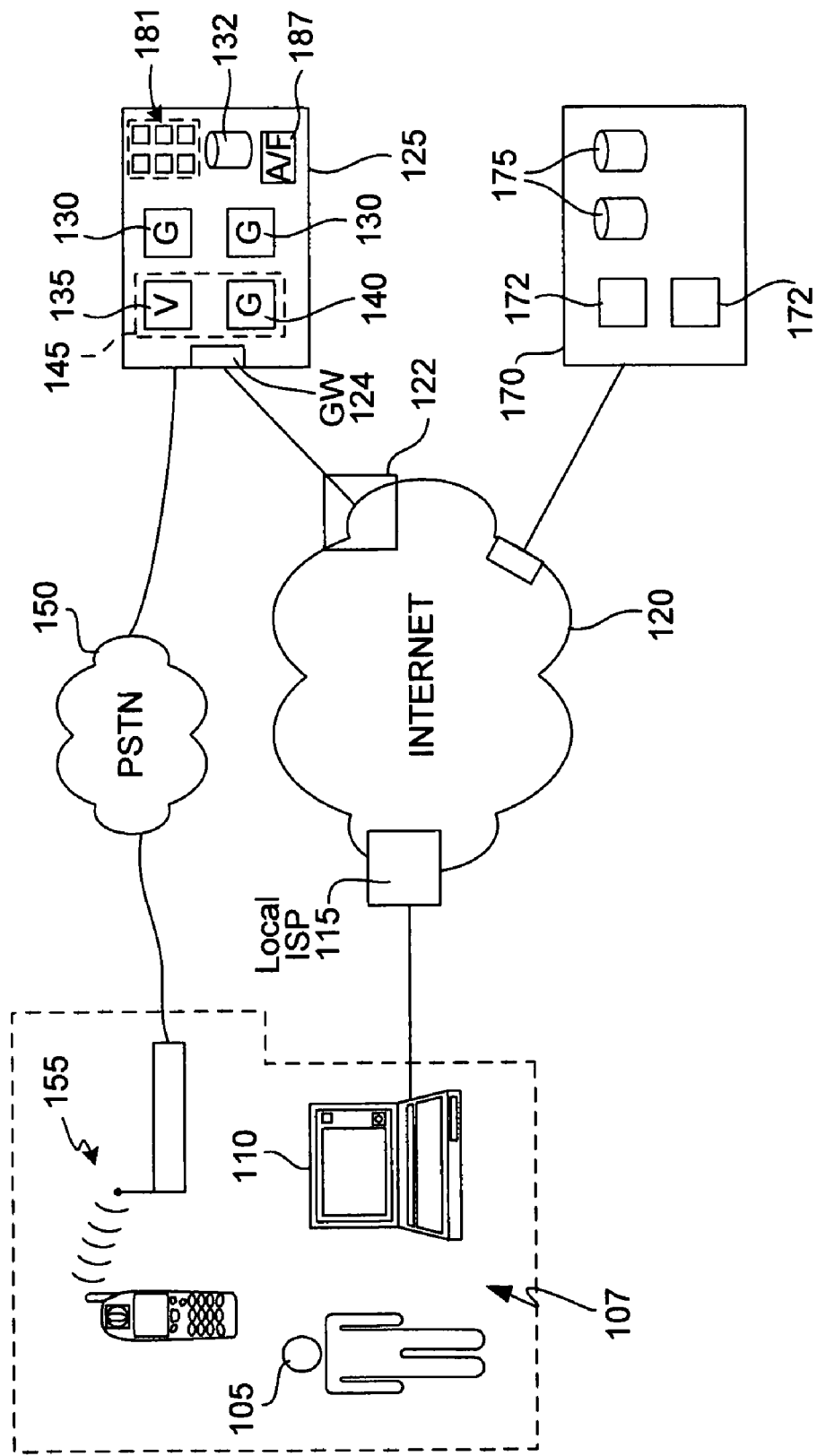
FIG. 1 illustrates an exemplary network for providing Internet gaming according to some embodiments of the invention.

Referring now to FIG. 1, an exemplary network for implementing some embodiments of the invention will be discussed. Client 105 is in uncontrolled environment 107, which includes client device 110 (here, a laptop computer) and telephone 155. Although client device 110 is a laptop in this example, client device 110 could be any of a wide variety of devices, such as a cellular telephone, a hand-held computer (e.g., a personal digital assistant), a kiosk, an in-room game terminal, a desktop computer, etc., that includes the hardware and software needed for Internet gaming. In general, client device 110 will include at least a memory, a processing device, a display, at least one input device and at least one communication interface. The display may be a CRT, LCD, LED, plasma, or any other suitable display. The input device(s) may include a mouse, a keyboard, one or more devices for processing voice commands, or other devices known by those of skill in the art.

During the course of a game, a player may be required to make a number of decisions, which affect the outcome of the game. For example, a player may vary his or her wager on a particular game, select a prize for a particular game, or make game decisions regarding gaming criteria that affect the outcome of a particular game. The player may make these choices using a keyboard, a mouse, a video display screen, a voice command or some other device which enables a player to input information into client device 110.

Local Internet service provider ("ISP") 115 provides client device 110 access to network 120, which is the Internet in this example. Although not shown in FIG. 1, it will be understood that local ISP 115 can provide Internet access to many clients and that local ISP 115 is one of many ISPs providing Internet access. Therefore, client 105 is one of a potentially large number of clients who may participate in Internet gaming at any given time.

It will be understood by those of skill in the art that network 120 could be another type of network (such as a satellite network, a wireless network, a metro optical transport, etc.) Accordingly, a variety of protocols may be used for communication on network 120, such as Internet Protocol ("IP"), Fibre Channel ("FC"), FC over IP ("FCIP"), Internet SCSI ("iSCSI," an IP-based standard for linking data storage devices over a network and transferring data by carrying SCSI commands over IP networks), Dense Wavelength Division Multiplexing ("DWDM," an optical technology used to increase bandwidth over existing fiber optic backbones), or Code Division Multiple Access (CDMA, a wireless cellular communication technology).

Internet casino 125 includes a variety of devices adapted to present gaming events to clients via network 120 and to perform related functions. In this example, Internet casino 125 includes several network devices, such as game servers 130, verification server 135, gateway 124 and accounting/financial server 187. Although the devices that constitute Internet casino 125 do not need to be in the same physical location, for the sake of simplicity the embodiment of Internet casino 125 depicted in FIG. 1 does have all devices in a single location. Here, gateway 124 is a network device with network address translation ("NAT") and firewall capabilities that can support multiple devices of Internet casino 125 with a single external IP address. ISP 122 provides access to network 120 for gateway device 124.

Game servers 130 are configured to interact with client devices and provide gaming sessions. Game server 130 may be configured to accept wager or bet information, accept player game input, generate game event information, determine game outcomes, generate award information, etc. Verification server 135 verifies the identity, age and location of clients and determines whether gaming sessions should be authorized. In some implementations of the invention, verification server 135 uses a verification process that involves using telephone network 150 to access client 105 via telephone 155. The functions of verification server 135 will be discussed in more detail below.

Internet casino 125 may include other devices, such as storage device 132, accounting servers, progressive jackpot servers, etc. In some implementations, a single device may perform various functions. For example, network device 145 may include the functions of verification server 135 and game server 140. Conversely, the functions of a device represented in FIG. 1 as a single device may, in practice, be distributed over several devices. For example, there may be many storage devices in (or at least accessible by) Internet casino 125.

Internet casinos may provide additional services, including but not limited to cashless services, loyalty program services, auditing services, entertainment content services, communication services, gaming software services, bonus game/linked game services, prize services, etc. In some implementations, game servers may provide some or all of such services, whereas in other embodiments separate network devices, storage devices, etc., may be dedicated to providing such services. In this example, cashless services, loyalty program services, auditing services, entertainment content services, communication services, gaming software services, bonus game/linked game services, prize services and other services are provided by servers 181.

Cashless services may include services and information related to, e.g., electronic fund transfers. Loyalty program services may include services and information related to the accumulation of player tracking points and the validation of player tracking points for services and prizes. Auditing/accounting services may include services and information relating to player identity, tracking the performance of different gaming activities, etc. Entertainment content services may include information and services related to streaming video feeds and audio feeds to a client device of, for example, sporting events. Communications services may include information and services related to peer-to-peer communications between various devices in Internet casino 125 and outside of Internet casino 125, such as text messaging, voice communications, video feeds, e-mail, paging and locator services.

Gaming software services may include devices configured for downloading software to client devices 110. For instance, a game server may provide gaming software and gaming licenses used to play different games of chance on client devices 110. Further, the game server may be used to provide software upgrades and "bug" fixes for the gaming software.

The bonus game/linked game services may include providing linked bonus games and tournament games to client devices 110. The prize services may include providing combinations of cash and non-cash prizes for awards on the client devices 110 and methods for redeeming the non-cash prizes. Progressive game services may be related to providing progressive jackpots for games of chance. Details of non-cash prize methods and game services that may be used with the present invention are described in co-pending U.S. application Ser. No. 09/515,717, filed on Feb. 29, 2000 by Nguyen and entitled "Name Your Prize Game Playing Methodology," which is incorporated herein in its entirety and for all purposes.

Financial institution 170, which may be a bank, a credit union, a credit card company, etc., includes network devices 172 and storage devices 175. Player 105 and/or Internet casino 125 may access financial institution 170 for various purposes, including but not limited to the electronic transfer of funds for gaming.

Figure 2:
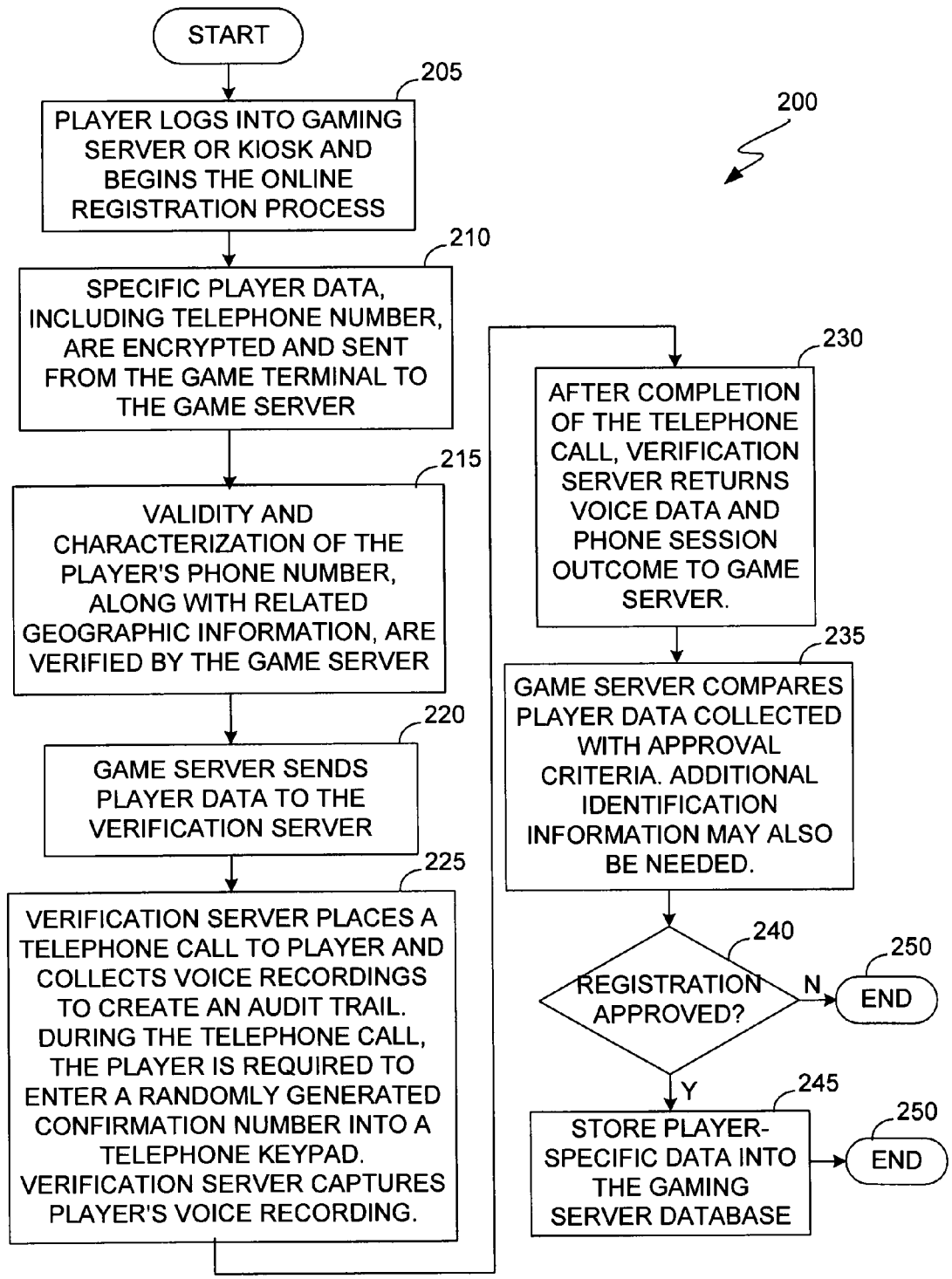
FIG. 2 is a flow chart that illustrates player registration according to some implementations of the invention.

FIG. 2 illustrates method 200 for online player registration according to some aspects of the present invention. As will be appreciated by those of skill in the art, the steps of methods according to the present invention may be performed in a different order and in a different fashion shown and described herein. For example, some implementations of method 200 do not include all of the details shown in FIG. 2, whereas other implementations include more steps and/or details than are shown in FIG. 2. Moreover, other registration processes are within the scope of this invention, such as in-person registration processes. Having a player register in person would, for example, facilitate player identification and the collection of biometric data (including but not limited to voice biometric data). In preferred implementations, registration is normally a one-time event.

In step 205, a player logs into a network device associated with Internet casino 125 (e.g., network device 145 or one of gaming servers 130) to begin the registration process. In this example, the player uses client device 110, logs into network device 145 via the Internet according to one of many login procedures known by those of skill in the art, then enters registration data (including name, age, address and a telephone number) into fields of a registration page provided by network device 145, e.g. via HTML. The registration data may include other information, such as data regarding the player's accounts maintained by financial institutions (e.g., bank accounts) that may be accessed to enable or facilitate gaming.

In step 210, the registration data are transmitted from client device 110 to network device 145. To transfer data in a secure manner, data transmitted between client devices 110 and Internet casino 125 may be encrypted. For example, an asymmetric encryption scheme incorporating a public-private encryption key pair may be used. Information encrypted with the private encryption key may be decrypted only using the corresponding public encryption key of the public-private encryption key pair and information encrypted with the public encryption key may be decrypted only using the private encryption key of the public-private encryption key pair. Thus, an entity with a private encryption key of public-private encryption key pair may give its public encryption key to many other entities. The public key may be made available (via an Internet server, e-mail, or some other means) to whoever needs or wants it. The private key, on the other hand, is kept secret. Only the owner of the key pair is allowed to possess the private key. The other entities may use the public encryption key to encrypt data. However, as long as the private encryption key remains private, only the entity with the private encryption key can decrypt information encrypted with the public encryption key.

In general, public-key encryption algorithms are very slow and it is impractical to use them to encrypt large amounts of data. In practice, symmetric algorithms are used for encryption/decryption of large amounts of data, while the public-key algorithms are used merely to encrypt the symmetric keys. Similarly, it is not usually practical to use public-key signature algorithms to sign large messages. Instead, a hash may be made of the message and the hash value may be signed. Methods of asymmetric and symmetric keys that may be used to transfer encrypted data in the present invention are described co-pending U.S. application Ser. No. 09/732,650, filed Dec. 7, 2000 by Nguyen et al. and entitled, "Secured Virtual Network in a Gaming Environment," which is incorporated herein in its entirety and for all purposes.

A private key of a public-private signature key pair may also be used to sign a message. The signature may be used for authenticating the message. When the private signature key is used to sign a message, then the public signature key must be used to validate the signature. The Digital Signature Standard (DSS) authorized by the U.S. government uses a private signature key, a public encryption key and a secure hash algorithm for generating and authenticating electronic signatures. For example, to send someone a digitally signed message, the message is signed with a private signature key, and the receiver of the message may verify the signature by using the public signature key corresponding to the private signature key. Prior to beginning a secure data transfer, the client device and the host server may have exchanged public encryption keys or public signature keys and other security information that may be used to establish the identity of the sender of a message to the client device and to identify messages sent from the client device.

In step 215, at least some of the registration information is verified and/or characterized by network device 145. For example, a database of telephone numbers and associated addresses (such as a database maintained by a telephone company) may be referenced to verify a telephone number and compare the associated address with one provided by the player. For example, the telephone number (including the area code, country code, etc.) may be checked to determine whether it is a valid number. Moreover, the telephone number may be characterized as to whether it is a blocked number, whether it is a business or a residential number, whether the associated telephone is connected to a land line, a wireless/cellular network, etc. As will be described in more detail below, if the telephone is a mobile telephone, this characterization may affect a player log-in procedure and related procedures for determining a player location. In some implementations, the player's registration will not be approved if the telephone is a mobile telephone.

According to some implementations of the invention, the device that received the registration data transmits these data to a separate verification server in step 220. However, in this example, network device 145 performs the functions of a gaming server and a verification server, so no such transmission is necessary.

Network device 145 then causes a telephone call to be placed to the player, e.g., via telephone network 150 to telephone 155 of FIG. 1 (step 225). For example, the server may be connected to an IP-PBX controller that is in communication with a public telephone network. A telephone company may switch the call to a land-line telephone, a cellular telephone, a VoIP telephone, etc.

During the call, an audit trail may be made by prompting the player to make oral statements verifying details of the registration data, such as age, location, etc. For example, the player may be required to may a statement such as, "I am [name]. I am _ years old and am located in [city/state/country] ." In some implementations, the player is also required to state certain limitations on gaming, such as the maximum amount of money that may be spent within a time period and/or a maximum amount of time that may be spent on gaming within a time period.

These voice data are captured by network device 145. The player may be required to enter a confirmation number into a keypad of telephone 155. The details of the call may vary according to various implementations of the invention.

If the verification functions are provided by a separate device, in optional step 230 the voice data and related data, if any, are transmitted to another device that is configured for implementing the registration process (e.g., a gaming server). In this example, such transmission is not required because network device 145 provides both registration and verification functionality.

Player data are then compared with approval criteria (step 235). These approval criteria may include, for example, the laws of the jurisdiction within which the player is located. Other approval criteria may include the player's credit rating, relationship to owners/operators of the Internet casino, etc. Additional information may be collected, e.g., if required to make a decision to approve or reject the registration. This information may be collected in any convenient manner, for example via telephone, via network 120, by requiring an in-person interview, or otherwise.

In step 240, the player's registration is either approved or rejected, based on the comparison in step 235. In this example, an approval will require at least: (1) verification that the player's registered location/address is within a jurisdiction that allows gaming; and (2) verification that the player is old enough to participate in gaming, according to the rules of the jurisdiction. If the player's registration is approved, the registration data and voice data are stored, e.g., in database 132 (step 245), for future reference and/or analysis. For example, the voice data may be analyzed to determine a digital "voice print" for the player, according to a text-dependent or text-independent voice biometric algorithm. A text-dependent system requires a player to speak the same phrase during verification that was spoken during registration; a text-independent system can verify a player using random spoken words. Preferably, the player is provided with a user ID and a password to use when requesting gaming sessions. Method 200 ends in step 250.

Figure 3:
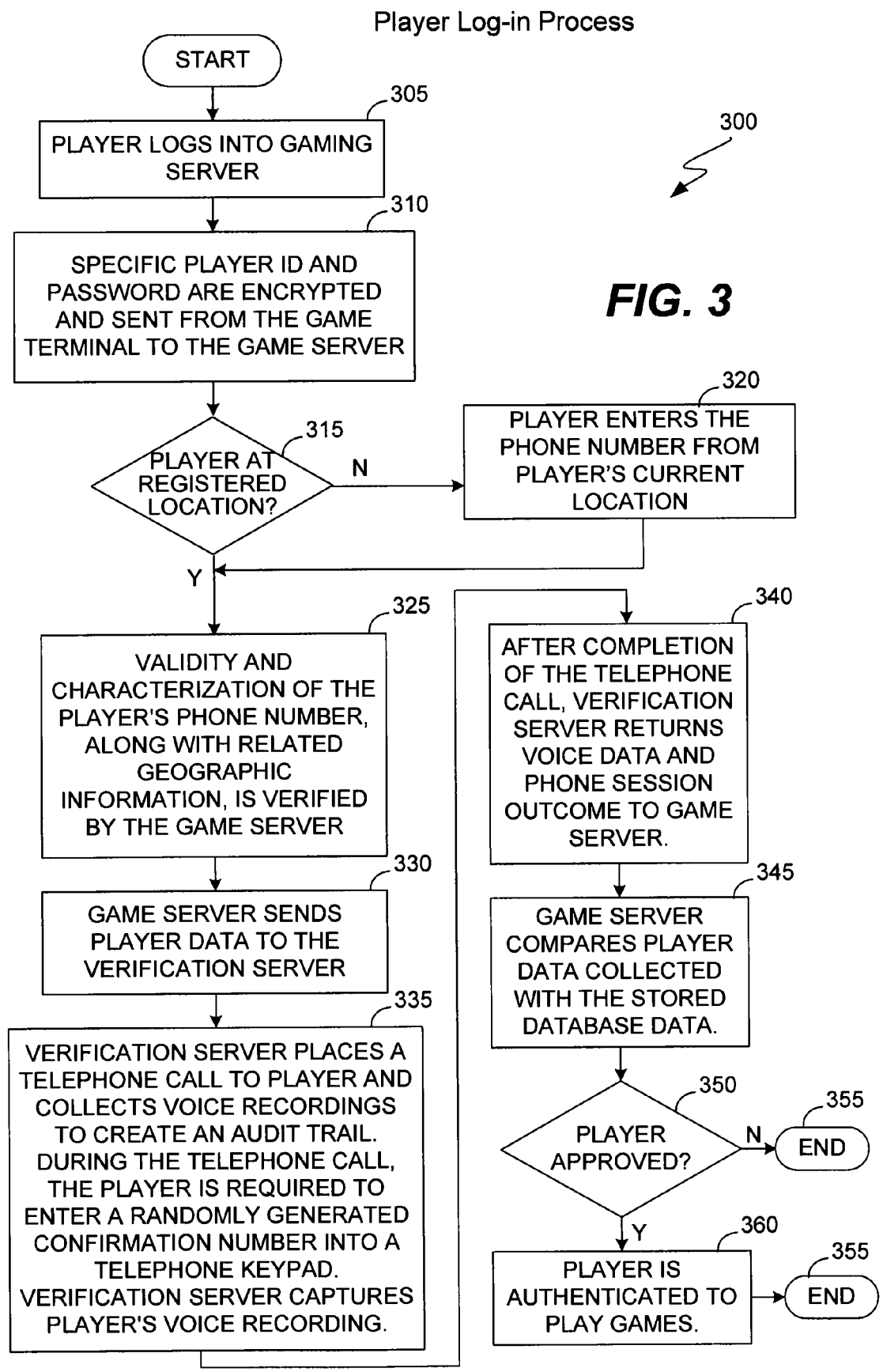
FIG. 3 is a flow chart that illustrates a player log-in process according to some implementations of the invention.

FIG. 3 is a flow chart that depicts method 300 for processing a player's request to initiate a gaming session according to some implementations of the invention. In step 305, the player logs into a network device of Internet casino 125. As part of the login process, a player ID and password are transmitted to Internet casino 125, preferably in an encrypted form (step 310). In this example, the player logs into a gaming server that is separate from a verification server. Those of skill in the art will appreciate that the tasks performed by the verification server and the gaming server in this example could be performed by a single network device (e.g., network device 145) or by more than two devices. Moreover, even in systems that use the same number of devices to process a player's request to initiate a gaming session, the allocation of tasks between network (or other) devices may differ from that set forth below and still be within the scope of the present invention.

In step 315, the gaming server asks the player to indicate whether the player is at the registered location. The player's response is not determinative, but instead is verified in a later step. If the player indicates that she is not at the registered location, the player is prompted to enter the telephone number of the player's current location (step 320). The telephone number that the player has indicated to be applicable to the player's current location is characterized and verified in step 325. In this example, the gaming server determines the address associated with the telephone number, although in other implementations the verification server performs this step. The game server then transmits player data, including stored player data from the registration process and the player's current telephone number and address, to the verification server (step 330).

In step 335, the verification server places a call to the telephone number indicated by the player. The verification server requires the player to enter a confirmation number (preferably a randomly generated number) into the keypad of the telephone. If the telephone has been characterized as a land line having a fixed location, this step verifies that a human being at the proper location is entering the proper number into the telephone. If the telephone has been characterized as a mobile telephone, in some implementations the player will not be permitted to initiate a gaming session. However, in other implementations, a procedure is followed that takes into account the fact that the player may change her location during the gaming session. One such implementation is discussed below with reference to FIG. 4.

In this example, the next step is to obtain data necessary to identify the person who is requesting the gaming session. Therefore, the verification server also prompts the player to make sounds or statements and records these voice data. In some implementations, the player is required to state information relating to her identity and/or the requested gaming session, e.g., stating the player's name, age and location, stating a maximum amount of money that the player will be authorized to wager or stating a maximum time that the player will be allowed to play. Such statements may be used to place limits on the gaming session, if one is initiated, and may also be used to create an audit trail.

As noted above, the voice data may be analyzed to determine a digital "voice print" for the player, according to a text-dependent or text-independent voice biometric algorithm. If a text-dependent algorithm is used, the player will be prompted to utter the same words or sounds that were used during the registration process. However, if these words or sounds are recorded, they could be played back and used by another person to impersonate the player's identity. Therefore, in some implementations, if a text-dependent algorithm is used, the player will be required to utter the same words/sounds in a different order than was used during the registration process. If a text-independent algorithm is used, the verification server can require the player to utter different words or sounds than were used during the registration process. This analysis may be performed by the gaming server, by the verification server or by one or more other devices. In this example, the verification server performs the voice biometric analysis and creates a digital "voice print" for the person requesting the gaming session.

In step 340, the data gathered during the telephone call (and voice biometric data, if any) are transmitted to the game server. The game server compares these data with data obtained during and/or as a result of the registration process (step 345). In step 350, the game server determines whether the player's requested gaming session is approved. This decision can be based on a number of factors, depending on the particular implementation. In this example, an approval will require at least a verification that the player's location is within a jurisdiction that allows gaming. In other implementations, the requested gaming session will not be approved unless other criteria are satisfied, e.g., that there are sufficient funds in a player's account to fund the maximum amount of money authorized by the player for the gaming session.

If the requested gaming session is approved, the game server allows the requested gaming session to begin. If the requested gaming session is not approved, the process ends in this example (step 355). In alternative implementations, the player may be given additional opportunities to initiate the gaming session. In either case, the game server stores the voice print and the underlying voice data obtained by the verification server.

Figure 4:
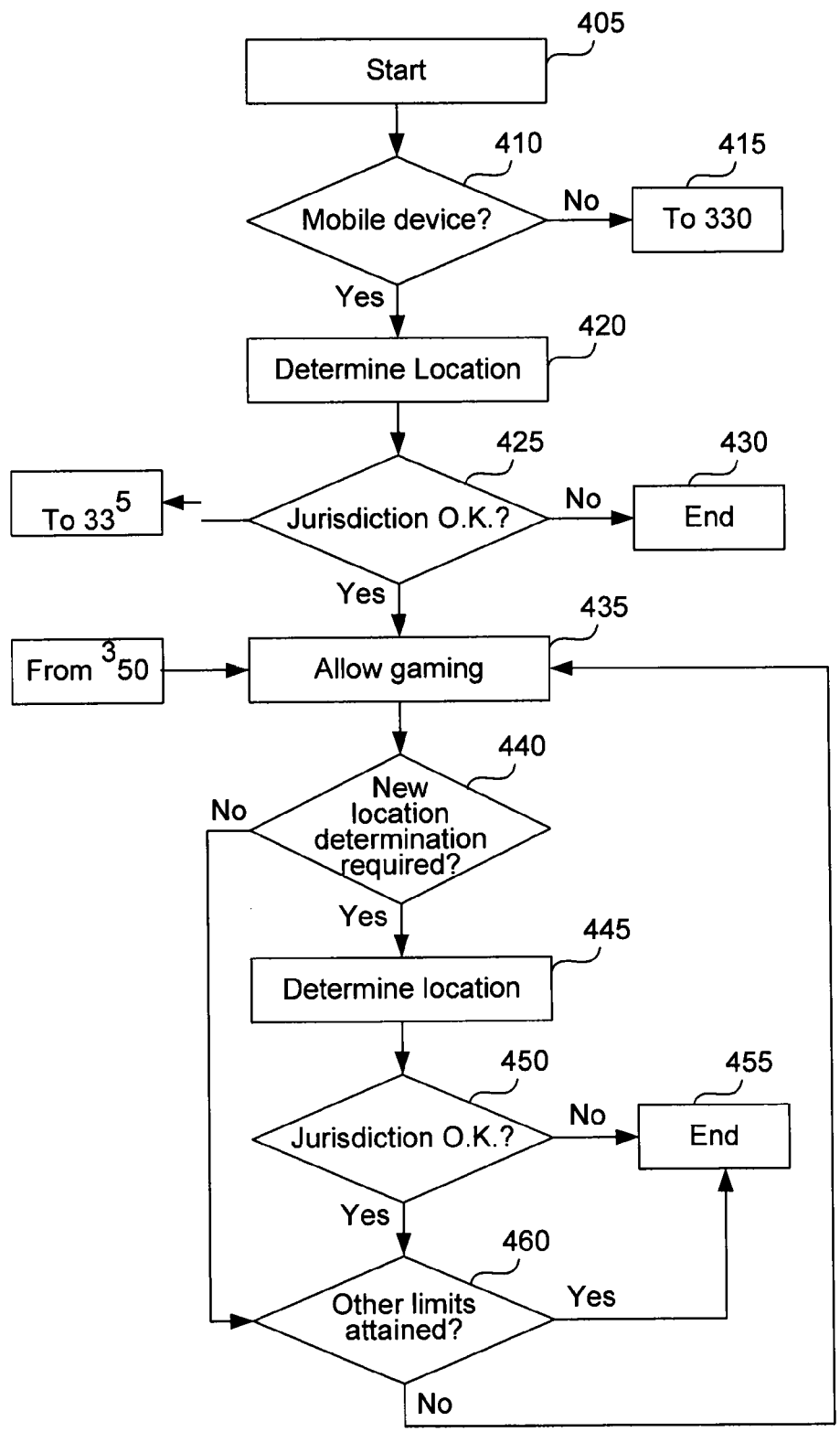
FIG. 4 is a flow chart that illustrates a log-in process for players using mobile telephones according to some implementations of the invention.

Method 400 of FIG. 4 is one exemplary method for processing a request from a player whose telephone is a mobile telephone. As noted above, some implementations of the invention simply do not permit a player to initiate a gaming session unless the player will participate from a fixed location with a stationary "land line" telephone available for location verification. However, method 400 provides location verification for a player's mobile telephone, thereby allowing a player to initiate a gaming session even when no land line is available to the player. Method 400 takes into account the fact that the player may change her location (and may possibly change legal jurisdictions) during a gaming session by performing periodic verifications.

In step 405, the player has indicated the telephone number of the location from which the gaming session is being requested (e.g., as in steps 305 through 315 or 320 of FIG. 3) and the associated telephone has been characterized (e.g., as in step 325). In step 410, it is determined whether the telephone is a mobile telephone. If not, the method continues to step 330 of FIG. 3, or a comparable step of a similar method according to the invention.

If the telephone is a mobile telephone, the player's location is determined in step 420. This determination may be made in a number of ways. If the mobile telephone has been characterized as one that provides GPS or similar capabilities, in step 420 a verification server polls the mobile telephone and receives the location information determined by the mobile telephone. Phase II of the Enhanced 911 ("E 911") system mandated by the Federal Communications Commission ("FCC") required cellular telephone providers to equip cellular telephones with Global Positioning System ("GPS") receivers according to a specified timetable: by Dec. 31, 2001, 25 percent of new handsets activated were to have GPS receivers; by Jun. 30, 2002, 50 percent of all new handsets activated were to have GPS receivers; and by Dec. 31, 2002, all new digital handsets activated were to have GPS receivers.

However, there are still many mobile telephones in service that lack GPS receivers. Therefore, in alternative implementations, step 420 may be performed by utilizing some functions put in place by Phase I of the E 911 system. In Phase I of the E 911 system implementation, the FCC required wireless carriers to deliver location information to an emergency dispatcher in a public safety answering point ("PSAP"). This information includes the telephone number of a wireless handset originating a 911 call and the location of the cell site or base station receiving the call. The location of the cell site or base station provides a rough approximation of the caller's location: because cells typically cover a range of approximately 10 square miles, the caller's location may be determined within approximately 2 miles. FCC Phase I of the E 911 system was to be implemented by the end of 1998.

Although the GPS attributes of the E 911 system were mainly put into place for responding to 911 calls, it is not necessary for the player to make a 911 call for methods of the present invention to use these GPS attributes. When a person places a call (e.g., to a game server of an Internet casino), the call setup between the telephone equipment includes cell site identification information (e.g., cell no. 12345). The telephone company has a database that indicates the locations of cell sites. The telephone company can forward this location information to the game server in much the same way as it would pass location information to an emergency dispatcher.

In step 425, the location information determined in step 420 is compared to jurisdictional boundaries to determine whether the player is located within a jurisdiction within which Internet gaming would be permitted. If not, the process ends (step 430). If the player is located within a jurisdiction within which Internet gaming would be permitted, the player validation procedure continues, e.g., by proceeding to step 335 of method 300.

If the player is approved in step 350 of method 300 (or the like), the requested gaming session begins in step 435. However, the player's location is preferably verified during the gaming session. In some implementations, the player's location is verified during a predetermined time interval. In other implementations, the frequency for determining the player's location is based on other factors, such as the player's proximity to a jurisdiction in which Internet gaming would not be permitted, whether the player's location changed between prior location determinations, the player's apparent speed (if the player's location is changing), or other such criteria.

Accordingly, in step 440, the appropriate criteria are applied to determine whether the player's location should be verified again. If so, the player's location is determined in step 445 and the jurisdiction is evaluated in step 450. If the jurisdiction is still acceptable, the process continues to step 460 in this example. If the player has left a jurisdiction in which Internet gaming would be permitted, the process ends. Preferably, both steps 425 and 450 will cause the gaming session to end before the player has left a jurisdiction in which Internet gaming would be permitted, e.g., by terminating the gaming session if the player's location is within a certain distance of a jurisdictional boundary, if the player's velocity indicates that the player will leave the jurisdiction within a certain time, etc.

If it is determined in step 440 that the player's location does not need to be verified, it is determined whether other limits to the gaming session have been attained (step 460). For example, time or monetary limits to the gaming session may be evaluated, as described above. If not, the gaming session continues. If any such limits have been reached, the gaming session ends (step 455).

Figure 5:
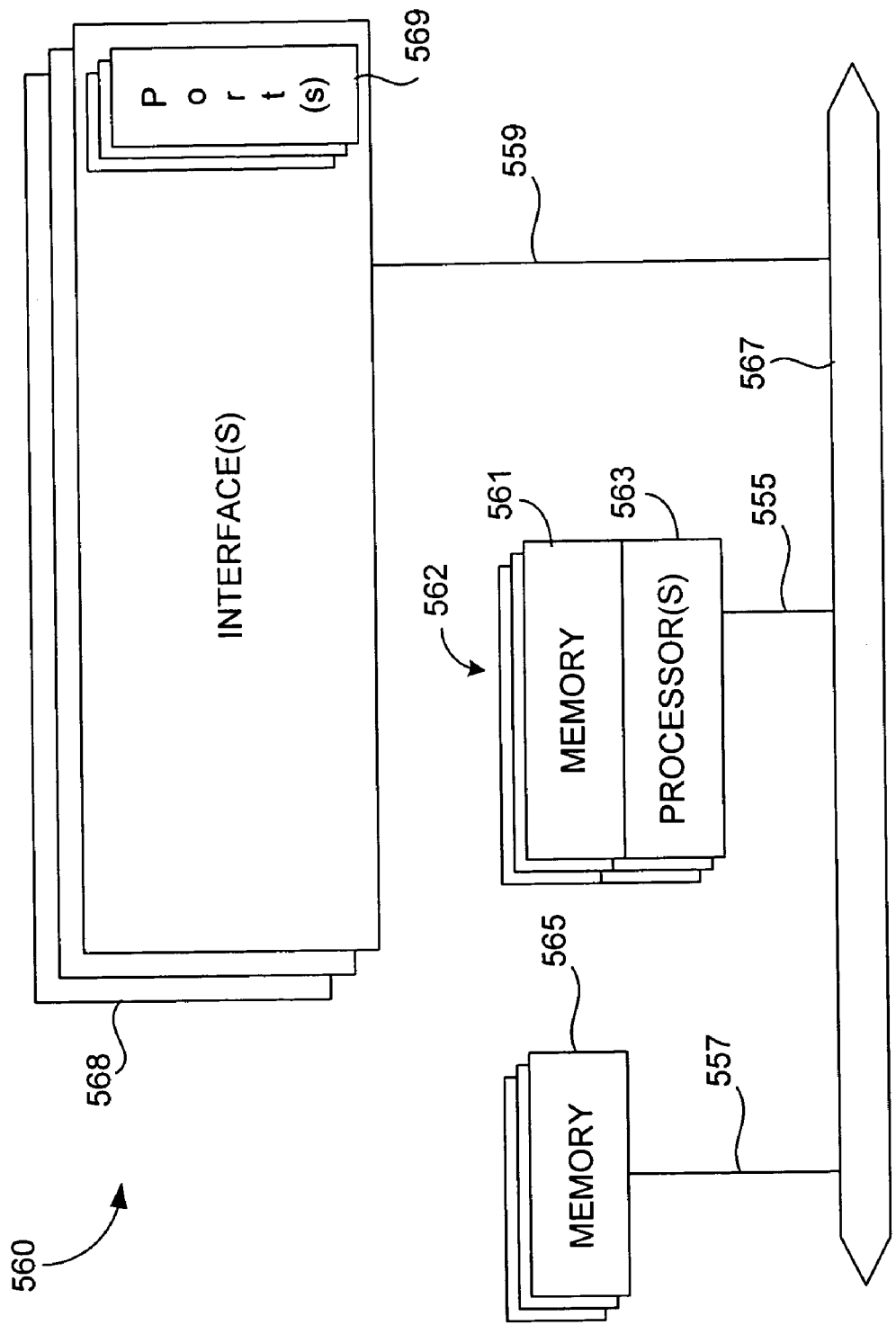
FIG. 5 illustrates a network device that may be used to implement some aspects of the invention.

FIG. 5 illustrates an example of a network device that may be configured to implement some methods of the present invention. Network device 560 includes a master central processing unit (CPU) 562, interfaces 568, and a bus 567 (e.g., a PCI bus). Generally, interfaces 568 include ports 569 appropriate for communication with the appropriate media. In some embodiments, one or more of interfaces 568 includes at least one independent processor and, in some instances, volatile RAM. The independent processors may be, for example ASICs or any other appropriate processors. According to some such embodiments, these independent processors perform at least some of the functions of the logic described herein. In some embodiments, one or more of interfaces 568 control such communications-intensive tasks as media control and management. By providing separate processors for the communications-intensive tasks, interfaces 568 allow the master microprocessor 562 efficiently to perform other functions such as routing computations, network diagnostics, security functions, etc.

The interfaces 568 are typically provided as interface cards (sometimes referred to as "linecards"). Generally, interfaces 568 control the sending and receiving of data packets over the network and sometimes support other peripherals used with the network device 560. Among the interfaces that may be provided are FC interfaces, Ethernet interfaces, frame relay interfaces, cable interfaces, DSL interfaces, token ring interfaces, and the like. In addition, various very high-speed interfaces may be provided, such as fast Ethernet interfaces, Gigabit Ethernet interfaces, ATM interfaces, HSSI interfaces, POS interfaces, FDDI interfaces, ASI interfaces, DHEI interfaces and the like.

When acting under the control of appropriate software or firmware, in some implementations of the invention CPU 562 may be responsible for implementing specific functions associated with the functions of a desired network device. According to some embodiments, CPU 562 accomplishes all these functions under the control of software including an operating system and any appropriate applications software.

CPU 562 may include one or more processors 563 such as a processor from the Motorola family of microprocessors or the MIPS family of microprocessors. In an alternative embodiment, processor 563 is specially designed hardware for controlling the operations of network device 560. In a specific embodiment, a memory 561 (such as non-volatile RAM and/or ROM) also forms part of CPU 562. However, there are many different ways in which memory could be coupled to the system. Memory block 561 may be used for a variety of purposes such as, for example, caching and/or storing data, programming instructions, etc.

Regardless of network device's configuration, it may employ one or more memories or memory modules (such as, for example, memory block 565) configured to store data, program instructions for the general-purpose network operations and/or other information relating to the functionality of the techniques described herein. The program instructions may control the operation of an operating system and/or one or more applications, for example.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher level code that may be executed by the computer using an interpreter.

Although the system shown in FIG. 5 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device. The communication path between interfaces may be bus based (as shown in FIG. 5) or switch fabric based (such as a cross-bar).

The above-described devices and materials will be familiar to those of skill in the computer hardware and software arts. Although many of the components and processes are described above in the singular for convenience, it will be appreciated by one of skill in the art that multiple components and repeated processes can also be used to practice the techniques of the present invention.

While the invention has been particularly shown and described with reference to specific embodiments thereof, it will be understood by those skilled in the art that changes in the form and details of the disclosed embodiments may be made without departing from the spirit or scope of the invention. For example, other implementations of the invention provide for the collection of other types of biometric data in addition to, or as an alternative to, the collection of voice data (voice data being merely one form of biometric data). Some embodiments provide a biometric device for use by remote players (e.g., a fingerprint sensor, a retinal scanner, a hand scanner, a camera, etc.). In some implementations, biometric data from this biometric device obviate the need for a voice print. In some such implementations, the biometric device is part of a telephone used by the player (e.g., a fingerprint sensor on a telephone). Some implementations allow remote players to make calls over the Internet using VoIP technology. Moreover, embodiments of the present invention may be employed with a variety of network protocols and architectures.

Thus, the examples described herein are not intended to be limiting of the present invention. It is therefore intended that the appended claims will be interpreted to include all variations, equivalents, changes and modifications that fall within the true spirit and scope of the present invention.

We claim:

1. A computer program embodied in a machine-readable storage medium, the computer program including instructions for controlling at least one network device to perform the following steps:
receive a request to initiate a gaming session from a user, the gaming session comprising: receiving a wager on a game; determining an outcome for the game; and presenting the outcome of the game;
ascertain whether the user is in a location in which the gaming session would be permitted;
determine a telephone number associated with the location; place a telephone call to the telephone number; prompt the user for a biometric response; verify whether the user is an authorized user based in part on the biometric response;
prompt the user to state a maximum amount of time for the gaming session;
initiate the gaming session if it is verified that the user is an authorized user and ascertained that the user is in a location in which the gaming session would be permitted; and
limit the gaming session according to the maximum amount of time.

2. The computer program of claim 1, further comprising instructions for controlling at least one network device to perform the following steps:
prompt the user to enter a confirmation number; and
verify that the user has entered the confirmation number.

3. The computer program of claim 1, wherein the verifying step comprises making a first recording of the biometric response.

4. The computer program of claim 1, wherein the verifying step comprises:
analyzing the biometric response to determine first characteristics; and
comparing the first characteristics with second characteristics of the user.

5. An integrated circuit operable to control a network device to perform the following steps:
receive a request to initiate a gaming session from a user, the gaming session comprising:
receiving a wager on a game;
determining an outcome for the game; and
presenting the outcome of the game;
ascertain whether the user is in a location for which the gaming session would be permitted;
determine a telephone number associated with the location;
place a telephone call to the telephone number;
prompt the user for a biometric response;
verify whether the user is an authorized user based in part on the biometric response;
prompt the user to state a maximum amount of money that the user will authorize for the gaming session;
initiate the gaming session if it is verified that the user is an authorized user and ascertained that the user is in a location in which the gaming session would be permitted; and
limit the gaming session according to the maximum amount of money.

6. The integrated circuit of claim 5, wherein the integrated circuit comprises an application-specific integrated circuit.

7. A set of semiconductor processing masks representative of at least a portion of the integrated circuit of claim 5.

8. The integrated circuit of claim 5, wherein the biometric response comprises one of a voice response, fingerprint data, retinal scan data, facial recognition data and hand shape data.

9. A network device, comprising:
at least one port configured for communication with a network; and
at least one processor configured to perform the following steps:
receive a request to initiate a gaming session from a user, the gaming session comprising:
receiving a wager on a game;
determining an outcome for the game; and
presenting the outcome of the game;
ascertain whether the user is in a location for which the gaming session would be permitted;
determine a telephone number associated with the location;
place a telephone call to the telephone number;
prompt the user for a biometric response;
verify whether the user is an authorized user based in part on the biometric response;
prompt the user to state a maximum amount of money that the user will authorize for the gaming session;
initiate the gaming session if it is verified that the user is an authorized user and ascertained that the user is in a location in which the gaming session would be permitted; and
limit the gaming session according to the maximum amount of money.

10. The network device of claim 9, wherein at least one processor is further configured to perform the following steps:
prompt the user to enter a confirmation number; and
verify that the user has entered the confirmation number.

11. The network device of claim 9, wherein the verifying step comprises making a first recording of the biometric response.

12. The network device of claim 9, wherein the verifying step comprises:
analyzing the biometric response to determine first characteristics; and
comparing the first characteristics with second characteristics of the user.

13. The network device of claim 9, wherein the biometric response comprises one of a voice response, fingerprint data, retinal scan data, facial recognition data and hand shape data.

14. A network device, comprising:
at least one port configured for communication with a network; and
at least one processor configured to perform the following steps:
receive a request from a gaming server to authenticate a user who has made a request to initiate a gaming session from an uncontrolled gaming environment, the gaming session comprising:
receiving a wager on a game;
determining an outcome for the game; and
presenting the outcome of the game;
ascertain whether the user is in a location for which the gaming session would be permitted;
determine a telephone number associated with the location;
place a telephone call to the telephone number;
prompt the user for a biometric response;
verify whether the user is an authorized user based in part on the biometric response;

prompt the user to state a maximum amount of money that the user will authorize for the gaming session;

send a message to the gaming server to initiate the gaming session if it is verified that the user is an authorized user and ascertained that the user is in a location for which the gaming session would be permitted; and limit the gaming session according to the maximum amount of money.

15. The network device of claim 14, wherein at least one processor is further configured to perform the following steps:

prompt the user to enter a confirmation number; and
verify that the user has entered the confirmation number.

16. The network device of claim 14, wherein the verifying step comprises making a first recording of the biometric response.

17. The network device of claim 14, wherein the verifying step comprises:

analyzing the biometric response to determine first characteristics; and
comparing the first characteristics with second characteristics of the user.

18. The network device of claim 14, wherein the biometric response comprises one of a voice response, fingerprint data, retinal scan data, facial recognition data and hand shape data.

19. The network device of claim 14, wherein the verifying step comprises verifying that the user is old enough to participate in the gaming session according to laws applicable to the location.

20. The network device of claim 14, wherein the ascertaining step comprises determining positioning data associated with a cellular telephone.

21. The network device of claim 14, wherein the ascertaining step comprises determining an address associated with the telephone number.

22. The network device of claim 14, wherein the ascertaining step comprises:

determining a user location; and
comparing the user location with a list of locations for which gaming may be conducted from an uncontrolled gaming environment.

23. The network device of claim 22, wherein the step of determining a user location comprises:

determining a location of a network device in the vicinity of a host device operated by the user; and
comparing the location of the network device with the address associated with the telephone number.

24. The network device of claim 14, wherein the biometric response comprises one of a voice response, fingerprint data, retinal scan data, facial recognition data and hand shape data.

25. The network device of claim 14, wherein the verifying step comprises verifying that a bet size, a session time, a maximum prize allowed, a time of day for gaming or a purse size is permissible according to laws applicable to the location.

26. The network device of claim 14, wherein the prompting step comprises prompting the user to state the user's identity.

27. The network device of claim 14, wherein the prompting step comprises prompting the user to state a maximum amount of time that the user will be authorized to spend on the gaming session, further comprising limiting the gaming session according to the maximum amount of time.

28. The network device of claim 14, wherein the prompting step comprises prompting the user to make sounds that were not recorded during a user registration process, further comprising analyzing the sounds to determine a digital voice print for the user.

29. The network device of claim 14, wherein the prompting step comprises prompting the user to say words that were not recorded during a user registration process, further comprising analyzing the words to determine a digital voice print for the user.

30. The network device of claim 14, wherein the prompting step comprises prompting the user to say words in a first sequence that were recorded in a second sequence during a user registration process, further comprising analyzing the words to determine a digital voice print for the user.

31. The network device of claim 14, further comprising the step of determining whether an account associated with the user contains the maximum amount of money authorized by the user.

32. The network device of claim 14, wherein the biometric response comprises one of a voice response, fingerprint data, retinal scan data, facial recognition data and hand shape data.

33. A network device, comprising:

at least one port configured for communication with a network; and
at least one processor configured to perform the following steps:
receive a request to initiate a gaming session, the request being from a user in an uncontrolled gaming environment, the gaming session comprising:
receiving a wager on a game;
determining an outcome for the game; and
presenting the outcome of the game;
send an authentication request regarding the user to a verification server, the authentication request including a telephone number associated with the uncontrolled gaming environment;
receive a first authentication response from the verification server; initiate the gaming session if the first authentication response indicates that the user is an authorized user and that a location of the uncontrolled gaming environment is an authorized location; and
ascertain, based at least in part upon the location of the uncontrolled gaming environment and upon whether the telephone number corresponds with a mobile device, whether to verify, during the gaming session, that the user remains in a location in which the gaming session would be permitted.

34. The network device of claim 33, wherein at least one processor is further configured to determine a frequency for verifying the user's location.

35. The network device of claim 34, wherein the frequency is based, at least in part, on the user's proximity to a jurisdiction in which Internet gaming would not be permitted.

36. The network device of claim 34, wherein the frequency is based, at least in part, on whether the user's location changed between prior location verifications.

37. The network device of claim 34, wherein the frequency is based, at least in part, on the user's apparent speed.

* * * * *

UNITED STATES PATENT AND TRADEMARK OFFICE
CERTIFICATE OF CORRECTION

PATENT NO. : 7,577,847 B2  Page 1 of 1
APPLICATION NO. : 10/981435
DATED : August 18, 2009
INVENTOR(S) : Nguyen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1131 days.

Signed and Sealed this

Seventh Day of September, 2010

David J. Kappos
*Director of the United States Patent and Trademark Office*